(12) United States Patent
Tao et al.

(10) Patent No.: US 11,950,706 B2
(45) Date of Patent: Apr. 9, 2024

(54) READY TO ASSEMBLE CHAIR BASE

(71) Applicant: Living Style (B.V.I.) Limited, Tortola (VG)

(72) Inventors: Letao Tao, Bellevue, WA (US); Sam Min Wei, Guangdong (CN)

(73) Assignee: Living Style (B.V.I.) Limited, Tortola (VG)

( * ) Notice: Subject to any disclaimer, the term of this patent is extended or adjusted under 35 U.S.C. 154(b) by 0 days.

(21) Appl. No.: 17/521,742

(22) Filed: Nov. 8, 2021

(65) Prior Publication Data

US 2023/0147575 A1     May 11, 2023

(51) Int. Cl.
*A47C 4/02*     (2006.01)
*A47C 7/00*     (2006.01)
*F16B 12/14*     (2006.01)

(52) U.S. Cl.
CPC ............ *A47C 4/021* (2013.01); *A47C 7/004* (2013.01); *A47C 7/006* (2013.01); *F16B 12/14* (2013.01)

(58) Field of Classification Search
CPC ......... A47C 4/021; A47C 7/004; A47C 7/006; F16B 12/14; Y10T 403/7015
See application file for complete search history.

(56) References Cited

U.S. PATENT DOCUMENTS

| | | | | |
|---|---|---|---|---|
| 7,314,252 | B2 * | 1/2008 | Ohliv | A47C 7/004 248/188.7 |
| 11,419,420 | B1 * | 8/2022 | Wu | F16M 11/20 |
| 11,470,970 | B1 * | 10/2022 | Ai | A47C 7/004 |
| 2012/0080572 | A1 * | 4/2012 | Lin | A47C 7/004 248/188.7 |
| 2022/0218110 | A1 * | 7/2022 | Wu | A47C 7/006 |

FOREIGN PATENT DOCUMENTS

| | | | | |
|---|---|---|---|---|
| CN | 1454553 A | * | 11/2003 | ............ A47C 7/004 |
| CN | 201831355 U | * | 5/2011 | |
| CN | 204218395 U | * | 3/2015 | ............ A47C 7/004 |
| CN | 206499205 U | * | 9/2017 | |
| CN | 110089869 A | * | 8/2019 | ............ A47C 7/002 |
| CN | 110604413 A | * | 12/2019 | ............ A47C 7/002 |
| CN | 113116071 A | * | 7/2021 | |
| CN | 215820302 U | * | 2/2022 | |

* cited by examiner

*Primary Examiner* — Kimberly T Wood
(74) *Attorney, Agent, or Firm* — Hinckley, Allen & Snyder LLP; Stephen Holmes

(57) ABSTRACT

A unique and novel ready to assembly chair base is broken down into several component parts so that it can be packed in a smaller volume of space, and then easily assembled by the consumer. The chair base is formed in a manner that the base comes apart into at least two components. A first removable leg component and a second hub component consists of a central support with a tapered hole therein, a plurality of fixed legs and a truncated leg receiver configured and arranged receive and retain the removable leg component when the chair is assembled.

8 Claims, 8 Drawing Sheets

READY TO ASSEMBLE CHAIR BASE

BACKGROUND

1. Technical Field

The present disclosure relates generally to ready to assemble furniture, and more particularly to a ready to assemble chair base for a rolling office chair.

2. Background of the Related Art

Rolling office chairs are known to include a large diameter chair base having 5 or more legs radiating out from a central hub. Multiple legs in combination with a large diameter provides stability for a chair that is able to roll about as well as recline. While the large diameter chair base is critical to stability of the chair, it has the drawback of significantly increasing shipping costs because the diameter of the chair base is the largest dimension of the chair, and thus dictates the size of the packaging of the chair for shipping. A larger box reduces the number of boxes that can fit into a shipping container and increases the overall landed costs of the chair when shipped.

To reduce shipping costs, many such chairs are broken down into smaller subassemblies for shipping. For example, the chair base, post (gas lift), seat and seat back are disassembled and packed into a smaller box. This significantly reduces the size of the shipping box and the landed cost. However, the diameter of the chair base remains the largest dimension of the box contents and, as a result, still dictates the largest single dimension of the box. Because it is an ongoing objective of manufacturers to continually reduce landed cost of products, there is a continuing need in the industry to reduce the size of packaging, and in this case, packaging for rolling office chairs.

SUMMARY OF THE DISCLOSURE

The present disclosure provides a unique and novel ready to assemble chair base, which is broken down into several component parts, packed in a smaller volume of space, and then easily assembled by the consumer.

In one exemplary embodiment, the chair base is formed in such a manner that the base comes apart into at least two components.

A first removable leg component comprises a truncated portion of one of the five legs. A second hub component comprises a central body portion having a central tapered axially extending hole therein, a plurality of full length radially extending legs and a shorter leg receiver configured and arranged to receive and retain the first leg component when the chair base is assembled.

The leg receiver includes a radially inwardly extending channel with two semicircular receiver slots in the sidewalls of the channel. The channel further includes wedge walls extending radially outwardly from an inner wall thereof.

The leg component has a blade portion extending radially inwardly from an inner end thereof with two locking posts extending laterally outwardly therefrom.

During assembly, the inner end of the leg is inserted at an angle into the channel with the locking posts positioned in the receiver slots such that when the leg component is rotated into the assembled position (parallel with the leg receiver), a rounded wedge formed on the inner end of the blade contacts the wedge walls as the leg is rotated into assembled position to wedge the locking posts firmly into the receiver slots. When the locking posts are firmly positioned into the receiver slots and the blade is wedged firmly against the wedge walls the top wall of leg engages a lower inner wall of the channel to provide a stable user assembled chair base.

The top wall of the channel may further include a threaded hole therein to receive a bolt that is inserted through a hole in the underside of the removable leg and engaged with the threaded hole to firmly retain the leg in the assembled position.

In some exemplary versions of the chair base, the non-removable chair legs include grooves formed therein to replicate the assembly seam seen on the removable leg and create a uniform appearance of all legs.

In some exemplary embodiments, two or more of the five legs of the chair base are made to be removable.

Among the objects of the present disclosure is the provision of a ready to assemble chair base that is broken down into at least two component parts allowing it to be packed into a smaller volume of space than the fully assembled components.

Another object of the present disclosure is the provision of a ready to assemble chair base that may be easily assembled by the consumer with simple readily available tools.

Other objects, features and advantages of the invention shall become apparent as the description thereof proceeds when considered in connection with the accompanying illustrative drawings.

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE EXEMPLARY EMBODIMENTS

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Generally, the present disclosure provides a unique and novel ready to assemble chair base 10, which is broken down into two, or more component parts, allowing it to be packed in a smaller volume of space, and then easily assembled by the consumer.

Figure 1:
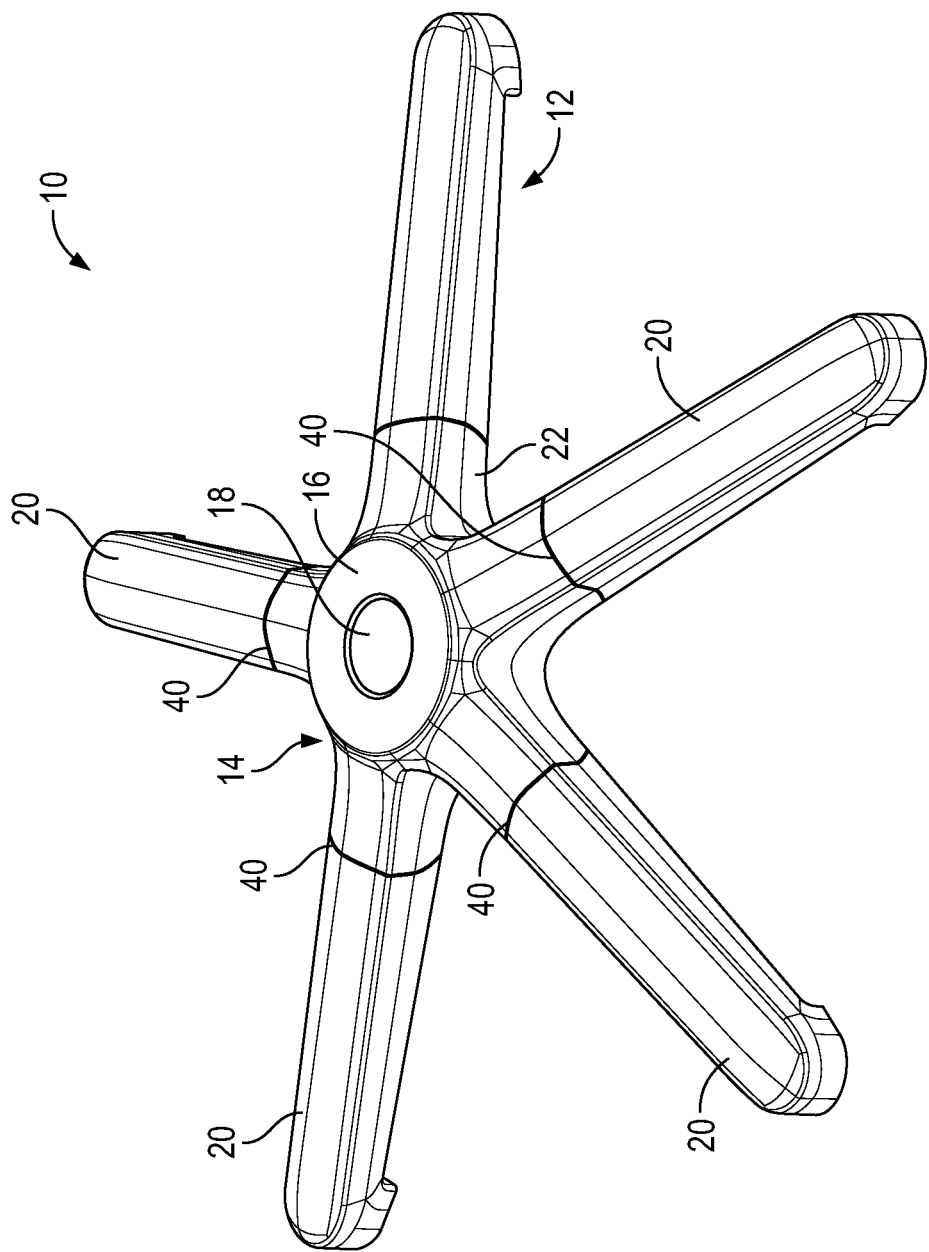
FIG. 1 is a top perspective view of an exemplary embodiment of the ready to assemble chair base constructed in accordance with the teachings of the present disclosure.
Figure 2:
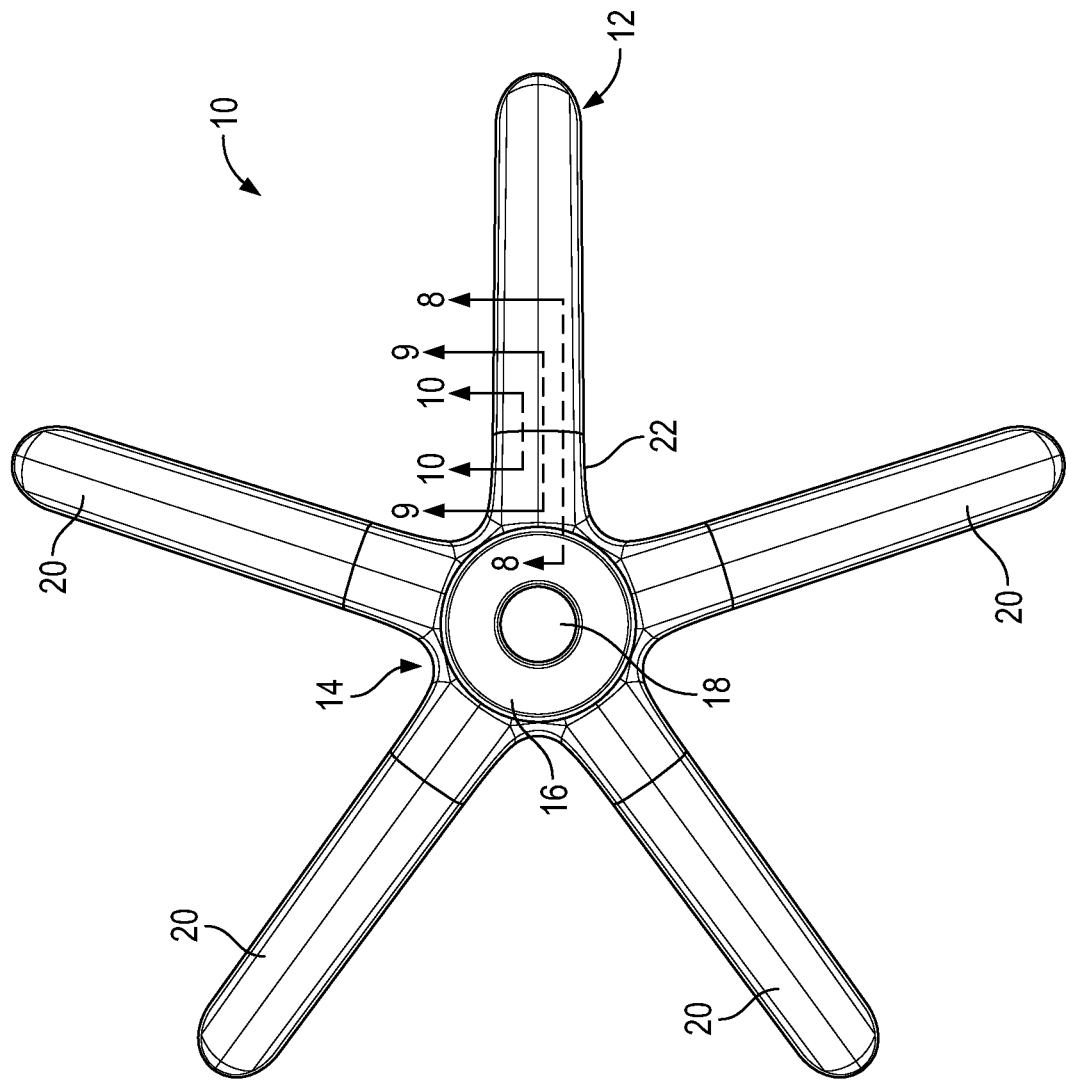
FIG. 2 is a top view thereof.
Figure 3:
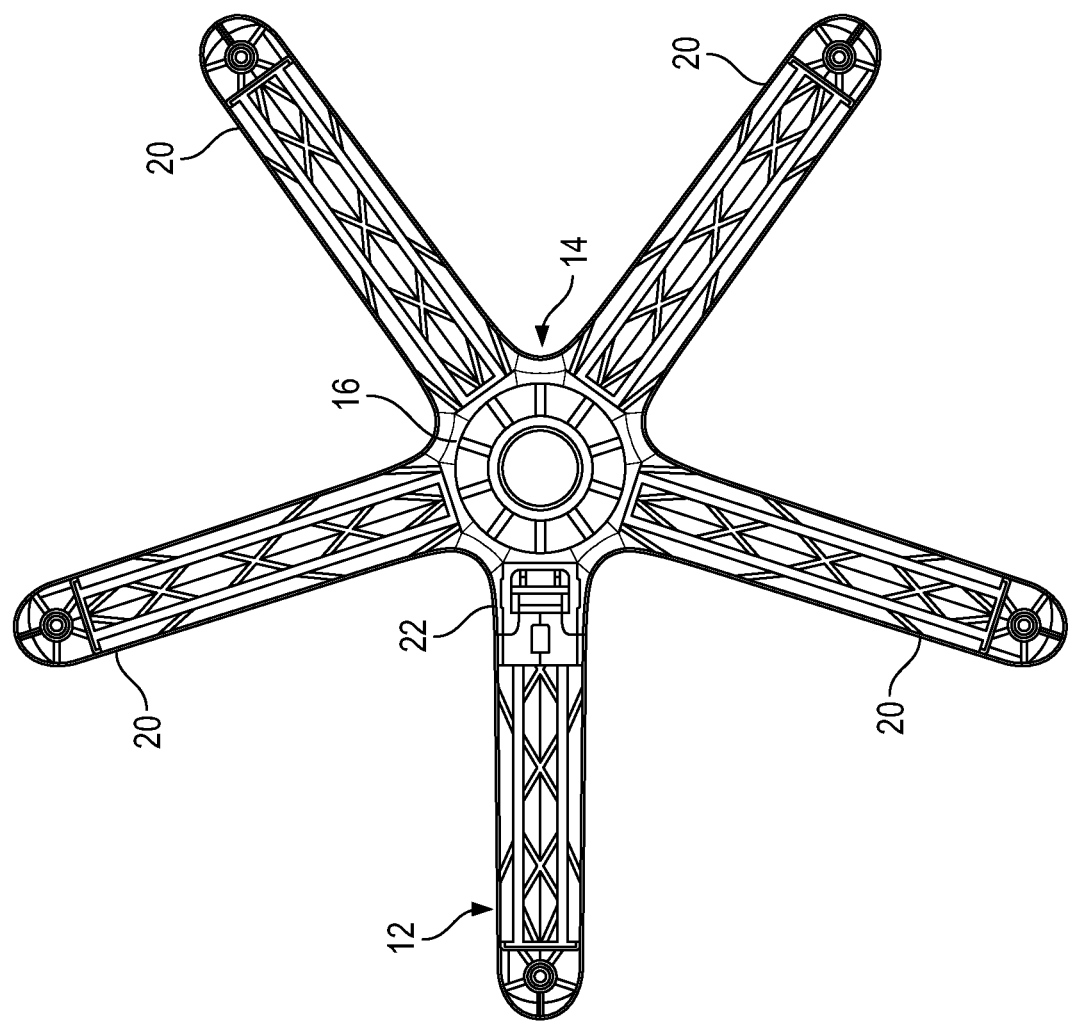
FIG. 3 is a bottom view thereof.
Figure 4:
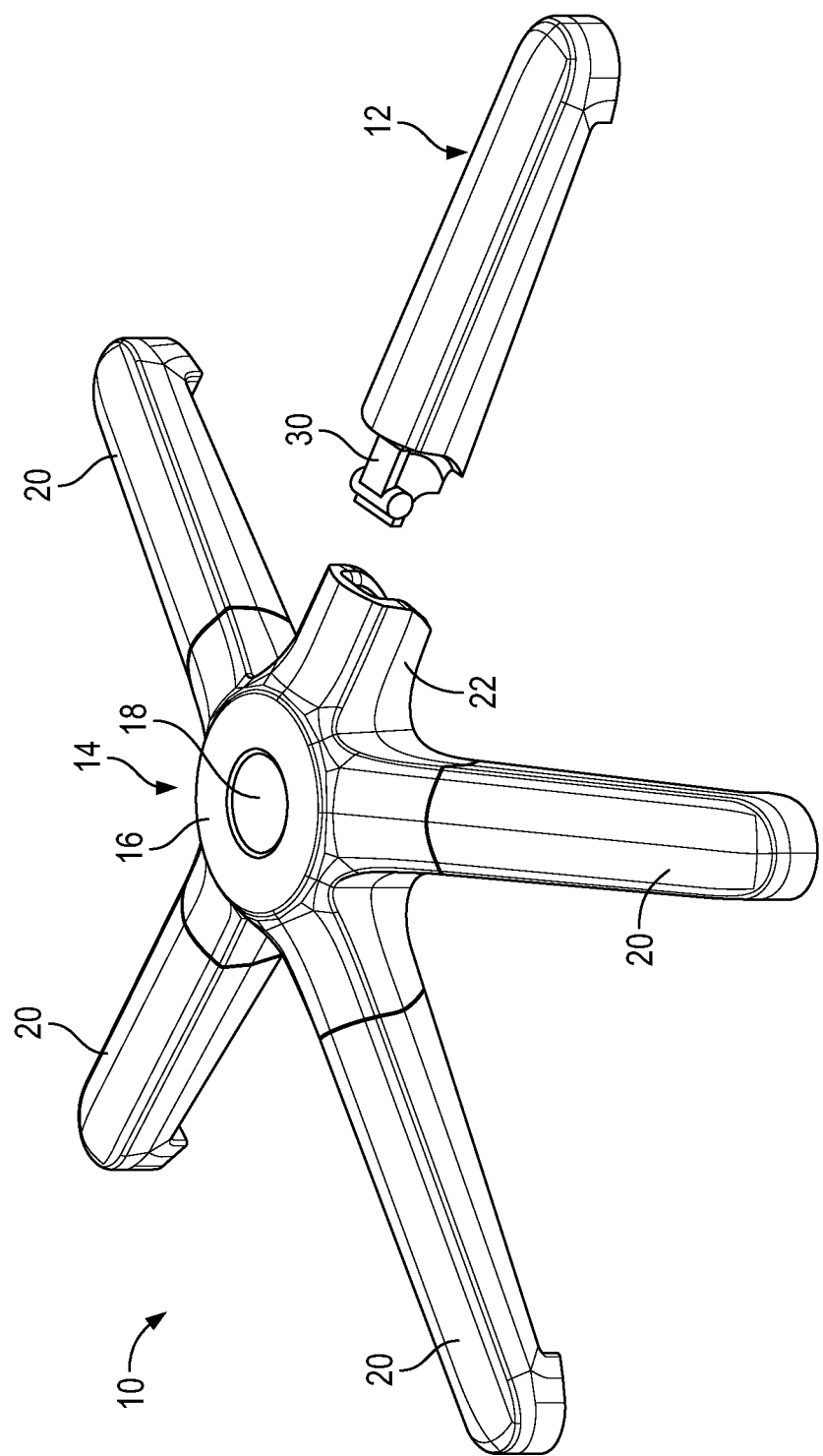
FIG. 4 is an exploded top perspective view thereof.
Figure 5:
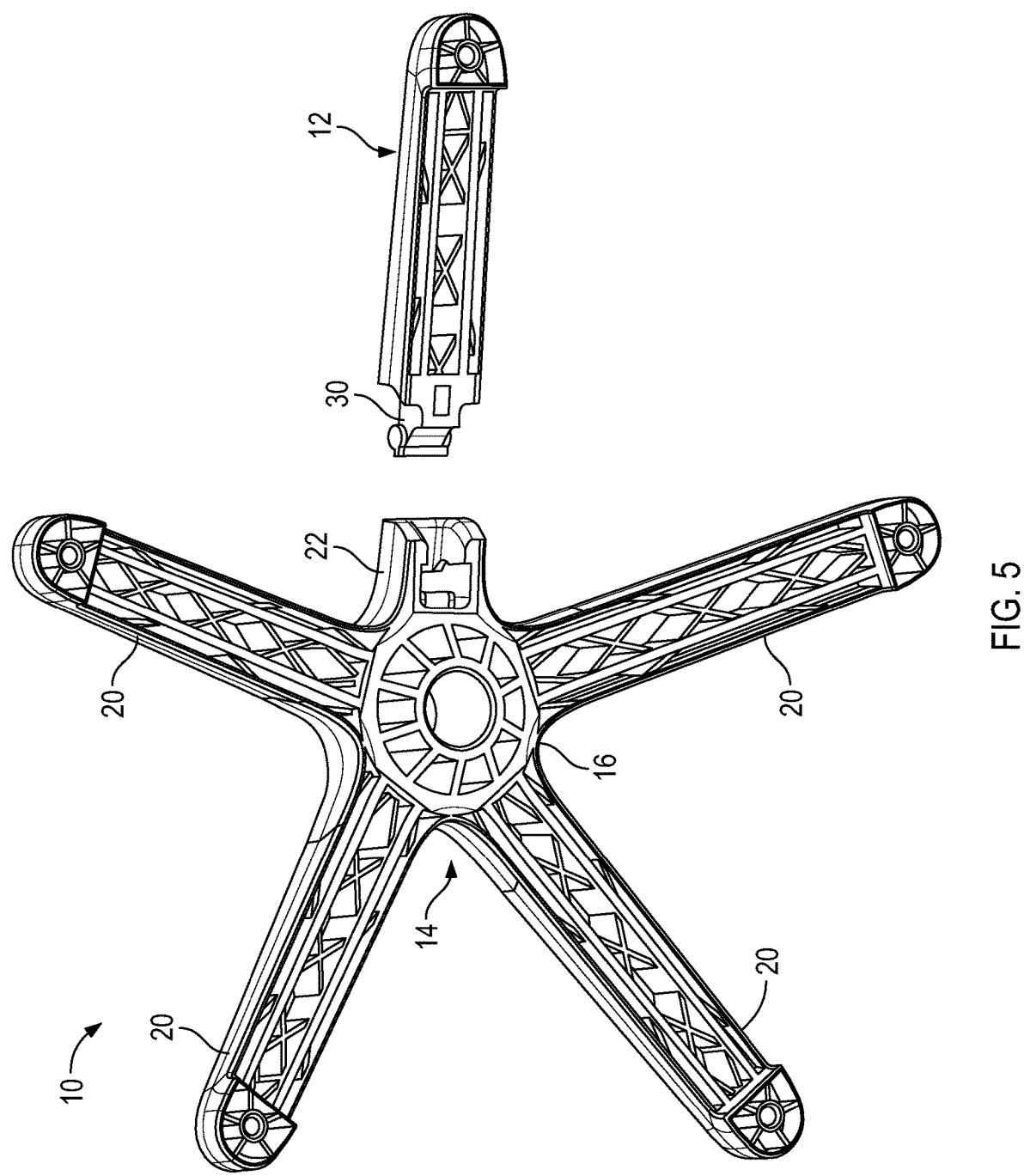
FIG. 5 is an exploded bottom perspective view thereof.
Figure 6:
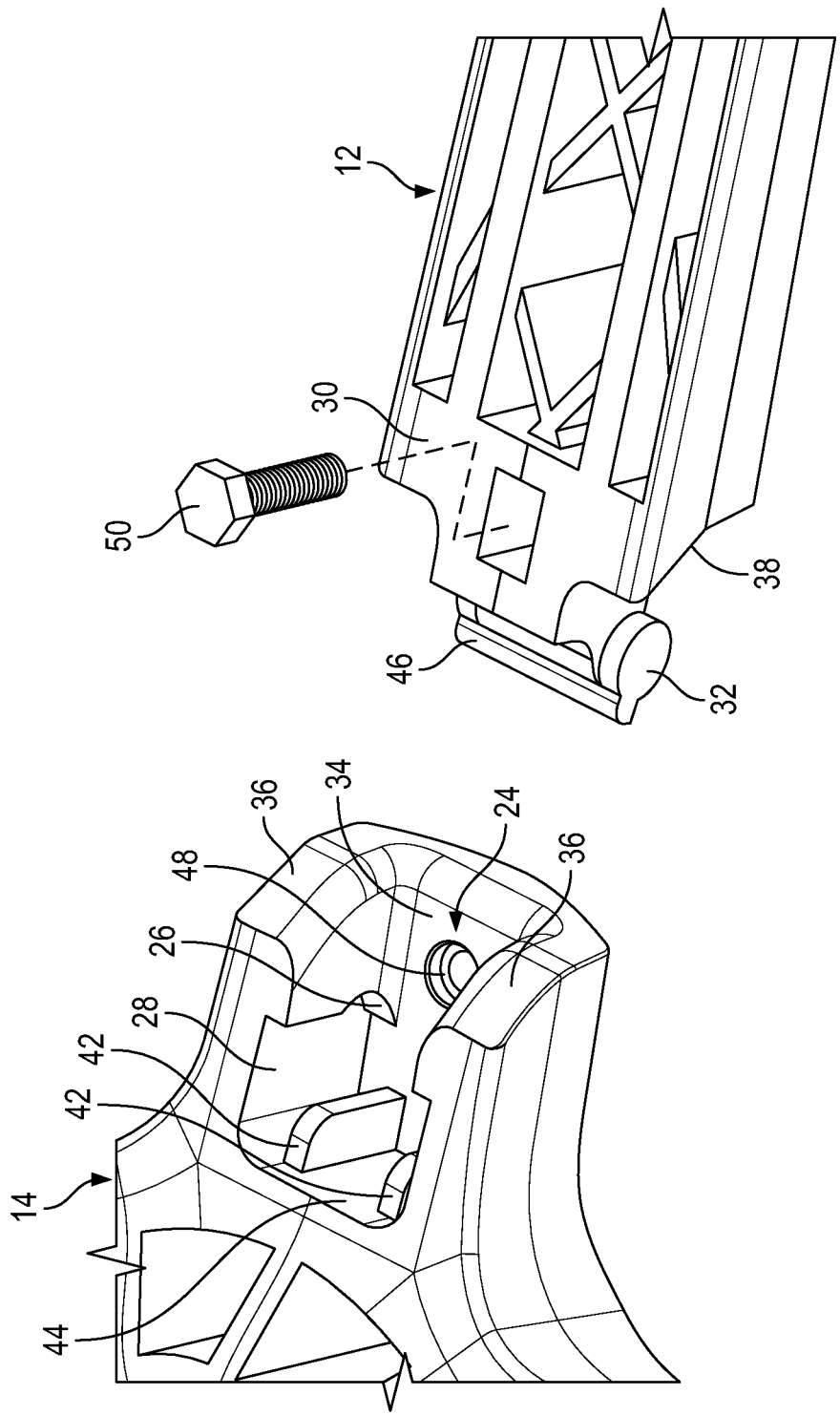
FIG. 6 is an enlarged exploded bottom perspective view of the removable leg joint construction of the ready to assemble chair base accordance with the teachings of the present disclosure.
Figure 7:
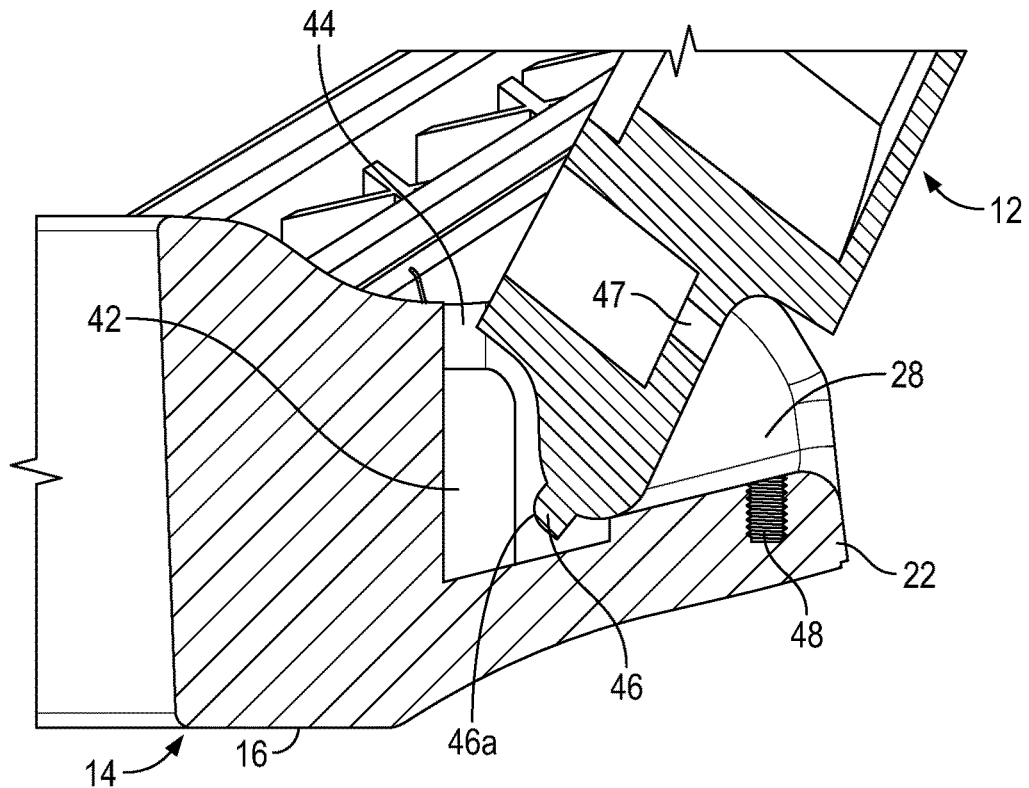
FIG. 7 is a cross-sectional view showing insertion of the leg component into the receiving channel of the base.
Figure 8:
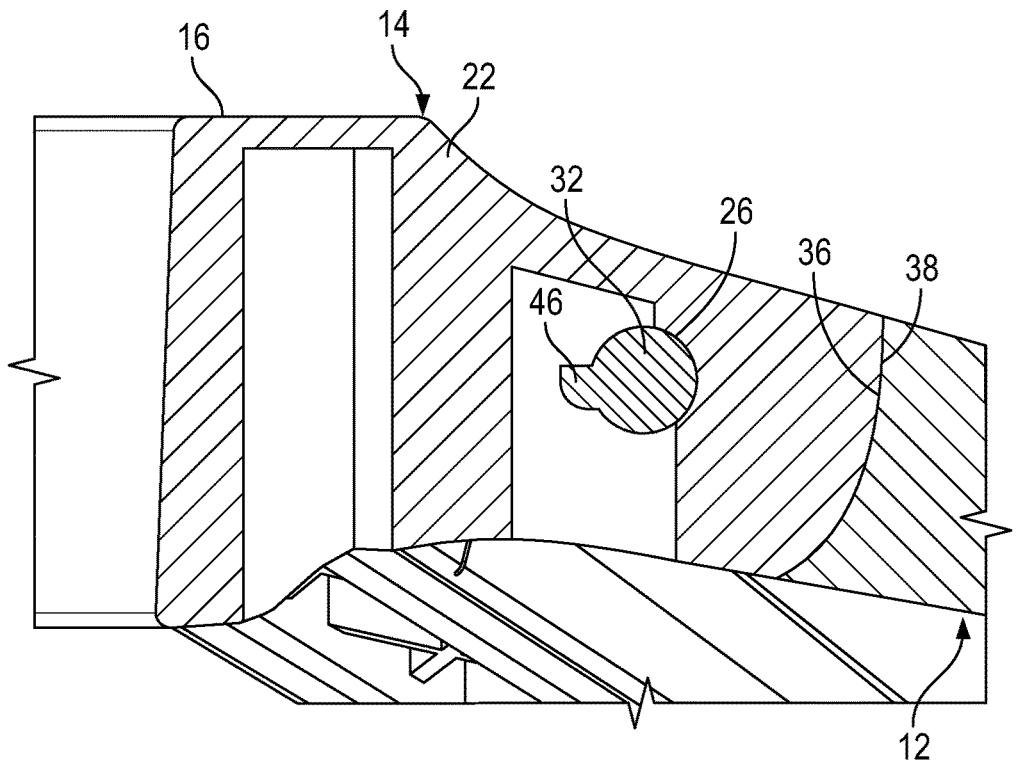
FIG. 8 is a cross-section view taken along line 8-8 of FIG. 2.
Figure 9:
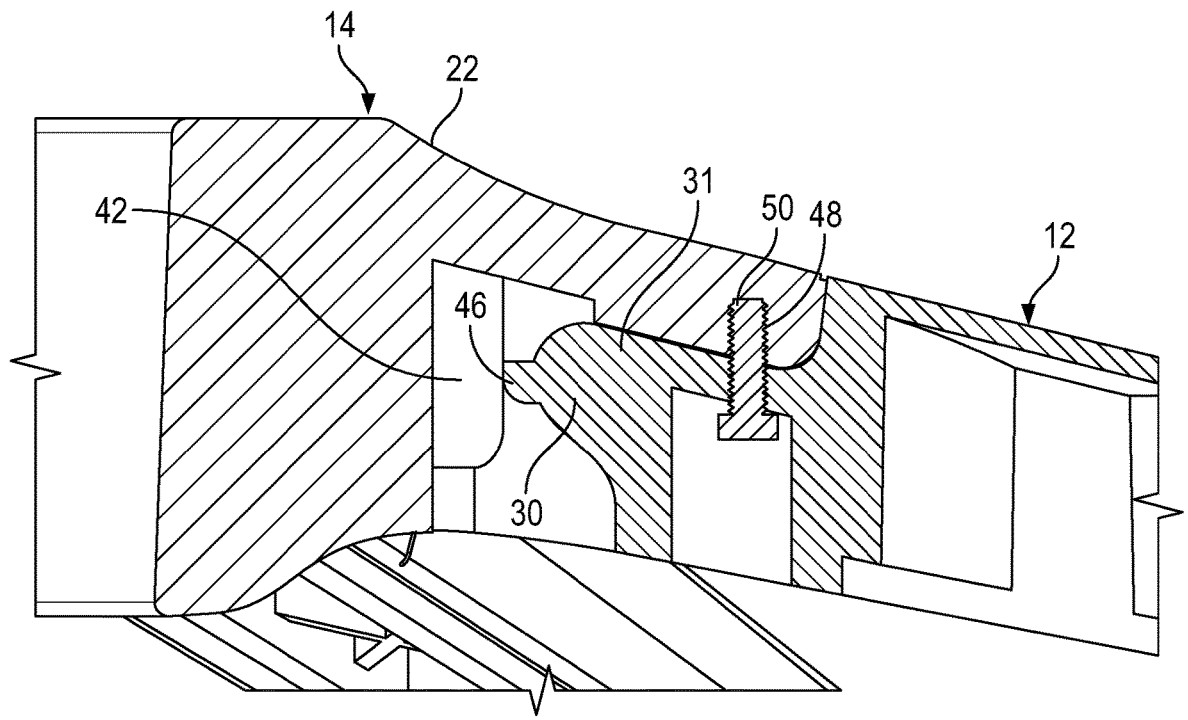
FIG. 9 is a cross-section view taken along line 9-9 of FIG. 2.
Figure 10:
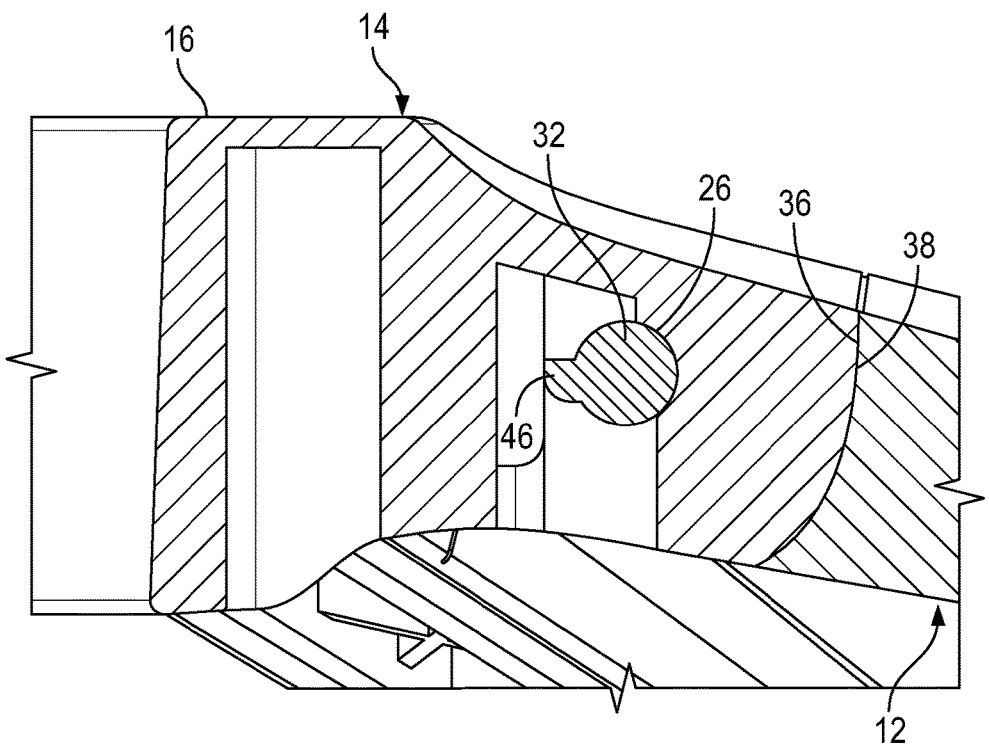
FIG. 10 is a cross-section view taken along line 10-10 of FIG. 2.

Turning now to the drawings, FIGS. 1-10 illustrate an exemplary embodiment wherein the chair base 10 is formed in such a manner that the base comprises at least two components, namely a leg component 12 and a hub component 14.

The first component is a leg portion 12 that includes a truncated portion of one of the five legs. The second component comprises a hub portion 14 having a central support 16 with a tapered axial hole 18 therein, a plurality of full length fixed legs 20 extending radially outwardly from the central hub 16 and a short leg receiver 22 configured and arranged to receive the leg component 12 when the chair base is assembled. The central hole 18 of the central support 16 is tapered and formed to receive and retain a gas lift assembly that functions as a seat post to support the seating portion of the chair.

Turning to FIGS. 6-10, the manner in which the leg 12 attaches to the leg receiver 22 is illustrated and detailed. The leg receiver 22 includes a radially inwardly extending channel 24 therein with two semicircular receiver slots 26 in the opposing sidewalls 28 of the channel 24. The channel 24 further includes wedge walls 42 extending radially outwardly from an inward wall 44.

The leg component 12 has a blade portion 30 extending radially inwardly from an inner end thereof with two locking posts 32 extending laterally outwardly therefrom.

During assembly, the inner end of the leg 12 is inserted at an angle into the channel 24 with the two locking posts 32 positioned in the receiver slots 26 (See FIG. 7) such that when the leg 12 is rotated into the assembled position (See FIGS. 8-10), a rounded wedge surface 46a formed on the inner end of the blade 30 contacts the wedge walls 42 to wedge the locking posts 32 firmly into the receiver slots 26. When the locking posts 32 are firmly positioned into the receiver slots 26 and the blade 30 is wedged firmly against the wedge walls 42, the top wall 31 of the blade 30 engages a top wall of the channel 24 to provide a stable user assembled chair base 10.

The top wall 34 of the channel 24 includes a threaded hole 48 therein to receive a bolt 50 that is inserted through a hole 47 in the underside of the removable leg 12 and engaged with the threaded hole 48 to firmly retain the leg 12 in the assembled position.

It can be further seen that the leg receiver 22 includes shoulders 36 flanking the ends of the channel 24 sidewalls 28. The shoulders 36 are configured and shaped to engage against corresponding shoulders 38 formed on the end of the leg 12 adjacent the blade 30. When the leg 12 is in the assembled relation and the locking posts 32 are engaged with the retainer slots 26, the shoulders 38 are drawn tightly into mating relation with shoulders 36 to provide additional support for the leg attachment to the base. Further it should be noted that the shoulders 36 and 38 are tapered in a manner to prevent them from further slipping in the assembled relation thereby adding stability to the assembled chair base 10. that are configured and It should be appreciated that while at least one removable leg 12 is shown, in other versions of the exemplary embodiment, more than one of the five legs for the chair base may use the same connection as detailed such that are also made to be removable, further providing even smaller packing sizes.

In some exemplary embodiments, the non-removable chair legs 20 include grooves 40 formed therein to replicate the assembly seam seen on the removable leg to provide a uniform appearance of all of the legs 12/20.

It can therefore be seen that the present disclosure provides a ready to assemble chair base that can be broken down into at least two component parts and packed into a smaller volume of space than the assembled components.

It can further be seen that the present disclosure provides a ready to assemble chair base that be easily reassembled by the consumer with simple readily available tools.

Although the embodiments shown herein illustrate a ready to assemble chair base, it would be appreciated by one skilled in the art that the chair base described herein may be adapted for various other types of chairs, stools, tables and/or standalone use.

Further, it would be appreciated by those skilled in the art that various changes and modifications can be made to the illustrated embodiments without departing from the spirit of the present invention. All such modifications and changes are intended to be within the scope of the present invention. While the present disclosure provides for various embodiments, it is intended for the subassemblies of the various embodiments to be discrete subassemblies that can be used in the various embodiments interchangeably.

What is claimed is:

1. A ready to assemble chair base comprising:
a hub portion having a central body with an outer peripheral extent and a plurality of non-removable legs extending radially outwardly from the central body, said central body having a radially extending leg receiver,
a removable leg component configured and arranged to be received and secured in assembled relation with said leg receiver,
said leg receiver having a channel therein with opposing sidewalls having receiver slots formed therein, said channel further having a front wall substantially adjacent to the outer peripheral extent of said central body,
said removable leg component having a blade extending from an inner end thereof, said blade including opposing locking posts extending therefrom, said locking posts configured and arranged to engage said receiver slots when said removable leg is received in assembled relation with said leg receiver, one or more wedge walls extending radially outward from said front wall of said channel, a wedge surface formed on an inner end of said blade wherein said wedge surface engages said one or more wedge walls when said removable leg is in assembled relation with said leg receiver, wherein the engagement between said one or more wedge walls and said wedge exert a force that increases engagement between said locking posts and said receiver slots;

a threaded bore in a top wall of said channel, a through hole in the blade of the removable leg component, and a threaded fastener extending through the hole in said blade portion of said removable leg and engaging said threaded hole, said threaded fastener retaining said removable leg in assembled relation with said leg receiver.

2. The ready to assemble chair base of claim 1, wherein said hub portion includes a hole centrally positioned therein to receive a chair support post.

3. The ready to assemble chair base of claim 1, wherein said receiver slots are semicircular in shape.

4. The ready to assemble chair base of claim 1, wherein a top of said blade is supported by a top wall of said channel when said removable leg component is in assembled relation with said leg receiver.

5. The ready to assemble chair base of claim 3, wherein a top of said blade is supported by a top wall of said channel when said removable leg component is in assembled relation with said leg receiver.

6. The ready to assemble chair base of claim 1, further comprising:
grooves formed in said non-removable legs to replicate a seam formed between said at least one leg receiver and said at least one removable leg.

7. The ready to assemble chair base of claim 3, further comprising:
grooves formed in said non-removable legs to replicate a seam formed between said at least one leg receiver and said at least one removable leg.

8. The ready to assemble chair base of claim 5, further comprising:
grooves formed in said non-removable legs to replicate a seam formed between said at least one leg receiver and said at least one removable leg.

\* \* \* \* \*